(No Model.)
G. WAUTERS.
APPARATUS FOR MOVING AND STEERING STEAMSHIPS.
No. 514,527. Patented Feb. 13, 1894.
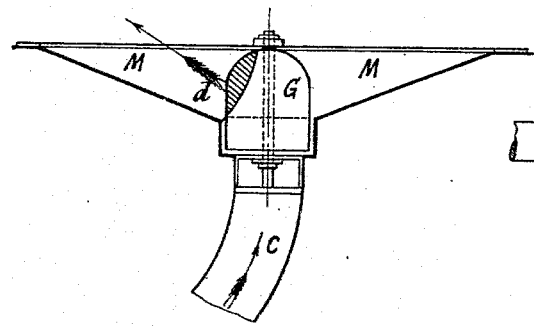
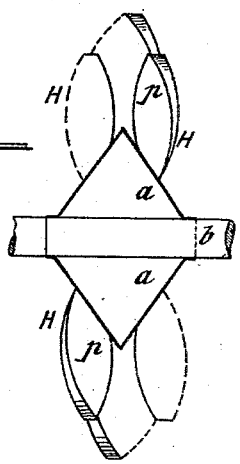
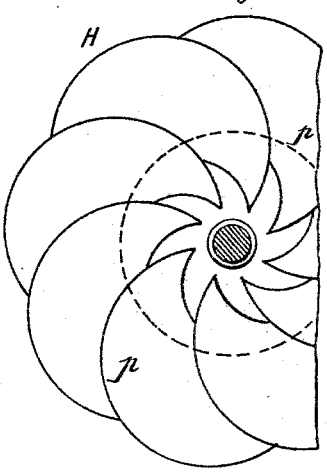
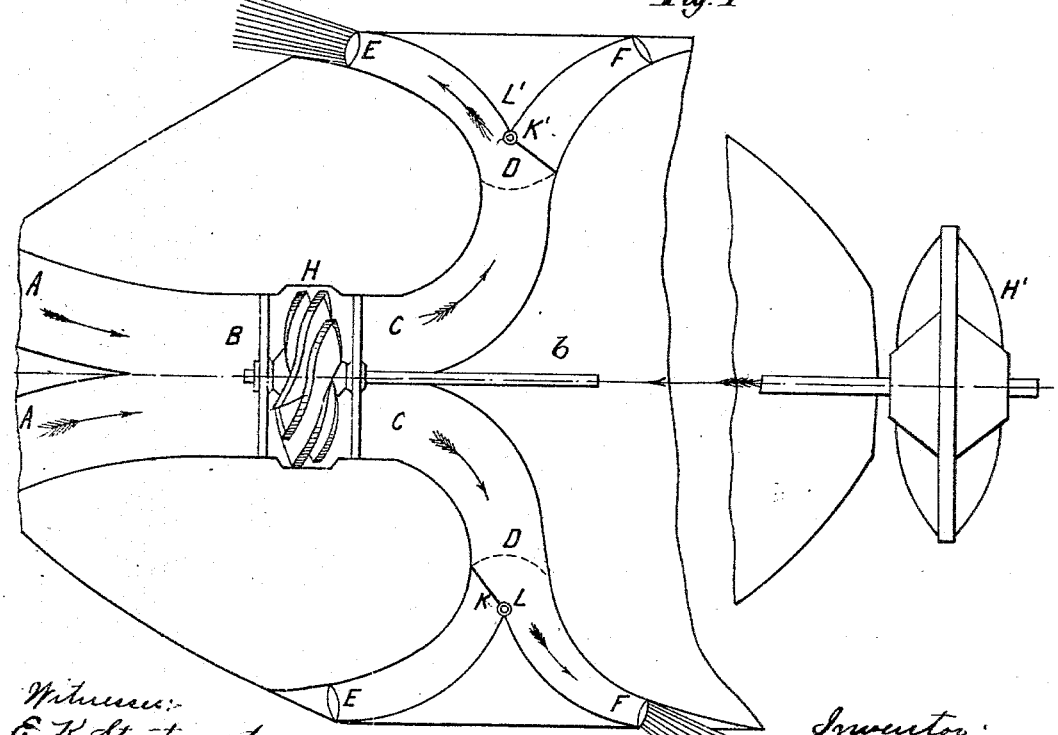

UNITED STATES PATENT OFFICE.

GUSTAVE WAUTERS, OF GRIMBERGHEN, BELGIUM.

APPARATUS FOR MOVING AND STEERING STEAMSHIPS.

SPECIFICATION forming part of Letters Patent No. 514,527, dated February 13, 1894.

Application filed March 3, 1893. Serial No. 466,755. (No model.)

*To all whom it may concern:*

Be it known that I, GUSTAVE WAUTERS, a subject of the King of Belgium, residing at Grimberghen, Belgium, have invented certain new and useful Improvements in Apparatus for Moving and Steering Steamships, of which the following is a specification.

The object of my invention is to provide means for utilizing a part of the water which stems against the keel of a vessel for propelling and steering the same. Said apparatus is shown in the annexed drawings of which—

Figure 1, is a sectional plan view of the invention; Fig. 2, a detail view of a modified part. Fig. 3, is a detail sectional view of the propeller, and Fig. 4, a side view of the same.

The driving part of the apparatus consists of a screw H, located inside of a tube B (Fig. 1) which can be rotated by a driving shaft $b$. The tube B, has two diverging openings A, toward the fore part of the vessel and divides into two lateral pipes or branches C, behind the screw H. Said pipes C, divide also into two pipes or branches E, F, of which those marked E, E, are directed toward the fore part or bow and those marked F, F, toward the aft part or stern of the vessel, the latter outlets being arranged tangential to the flanks of the vessel. Flap valves K, K' are arranged at the points where the pipes E, F diverge; these valves can be actuated from the vessel so that either the tubes E, or the tubes F, are connected with the tubes C, C.

The apparatus works as follows: The screw H, receives an independent rotary motion by means of its shaft $b$. As a consequence thereof the water which stems against the vessel by its forward motion is drawn into the pipe B, through the pipes A, and it is driven into the tubes C, C, by the screw H. From the tubes C, C, the water is forced outward either through branch E, or through branch F, according to the position of the valve. For propelling the vessel the valves must be fixed so that the water is compelled to flow out through the pipes F, F, when on the contrary a backward motion must be obtained the position of the valves must be adjusted so that the water flows out through the pipes E, E. If a side motion is desired it is necessary that the position of the valves be changed so that the pipe E, on one side and the pipe F, on the other side are open at the same time.

It is clear that a greater speed and easy steering are obtained by this apparatus, for the keel water which opposes a great resistance to the forward motion of the vessel is drawn in and utilized as desired. Furthermore a direct impelling power is obtained upon the vessel by forcing the water out through the pipes F, F, so that if the rotary motion of the screw H, is rapid enough the speed of the vessel can almost be doubled.

Figs. 3 and 4 show views of the screw H, on an enlarged scale. A double cone $a$, is fixed upon the driving shaft; upon this double cone small blades are adjusted in such a way that the whole forms a screw and in such a manner that not only the suction of the water takes place but also that its flowing through the pipes C, C, can take place without any noticeable friction or obstruction.

Fig. 2, shows a modification of the terminal of the pipe C, instead of using the branch pipes. In this modification the pipes C, end in longitudinal funnel shaped outlets M, M. A revoluble helmet shaped cover G, is fixed upon the extremity of the pipe C, the casing of which is cut out at the point $d$, so as to form an opening corresponding with the cross section of the pipe C. The cover G, can be actuated from the vessel in such a manner that the water in C, must either flow out toward the fore part or toward the aft part of the vessel through the longitudinal funnel, according to the position of said cover G. The advantage of this system over that I have described before is that it takes little room but the form first described offers less resistance to the water and reduces friction by reason of the form of joint between the pipes E and F.

The construction of the vessel itself does not require any change for adapting my apparatus and the propeller screw H' at the stern of the vessel may be arranged as usual, as shown in Fig. 1.

Of course this apparatus can, if desired be used only when an especially great speed or a very quick steering maneuver is required, while in the other case the openings of the pipes C, can be closed by the cover or valves.

I claim—

In a propelling apparatus for vessels the main channel, the water forcing device therein, the lateral branches in rear of said forcing device, each of said lateral branches having divergent discharge openings directed forwardly and rearwardly and the single valve arranged at the junction of the divergent discharge openings and serving to control each of said openings, substantially as described.

In witness whereof I have hereunto set my hand in presence of two witnesses.

GUSTAVE WAUTERS.

Witnesses:
G. VREULE,
GREGORY PHELAN.